Patented Mar. 11, 1924.

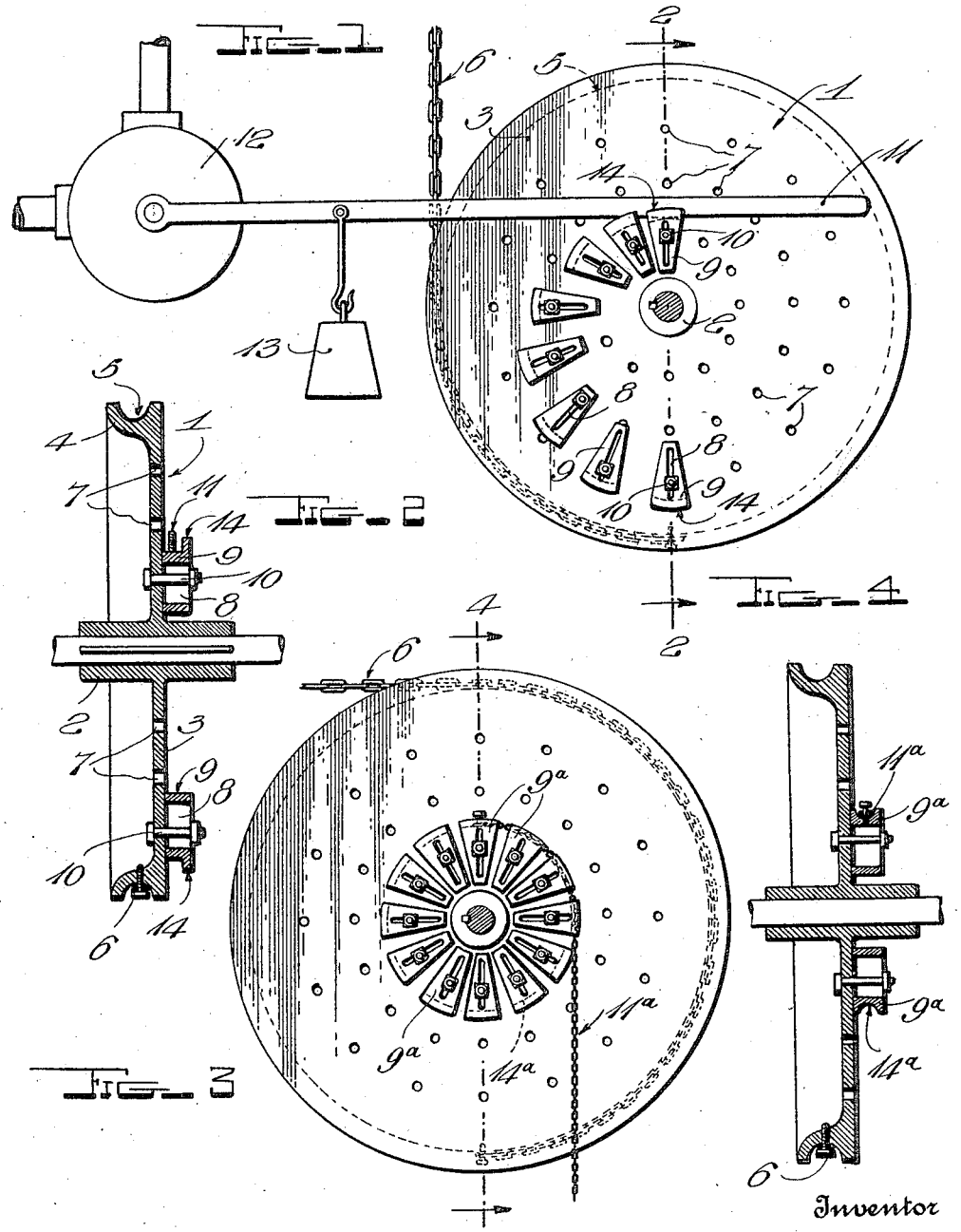

1,486,348

UNITED STATES PATENT OFFICE.

NELSON ROY KINDER, OF WEST FRANKFORT, ILLINOIS.

ADJUSTABLE SHEAVE.

Application filed May 10, 1923. Serial No. 638,056.

*To all whom it may concern:*

Be it known that I, NELSON ROY KINDER, a citizen of the United States, residing at West Frankfort, in the county of Franklin and State of Illinois, have invented certain new and useful Improvements in Adjustable Sheaves; and I do declare the following to be a full, clear, and exact description of the invention, such as will enable others skilled in the art to which it appertains to make and use the same.

My invention has for its object to provide a simple, inexpensive and efficient sheave adapted to be operated by a chain or other flexible element and having a plurality of adjustable segments on one side to perform any desired work.

With the foregoing in view, the invention resides in the novel subject matter hereinafter described and claimed, the description being supplemented by the accompanying drawing.

Figure 1 is a side elevation showing the application of one form of my invention to a throttle valve.

Figure 2 is a vertical sectional view on line 2—2 of Fig. 1.

Figure 3 is a side elevation showing a different form of construction.

Figure 4 is a transverse sectional view on line 4—4 of Fig. 3.

In the drawing above briefly described, the numeral 1 designates a disk carried by a suitable hub 2 and provided with one side 3 which is flat and disposed in the same plane from the hub to its extreme peripheral edge.

The opposite side of the disk is formed with an annular flange 4 at its periphery, having a circumferential groove 5 to receive a chain 6 or other flexible operating element which may be actuated by any desired control means. For instance, when my invention is used in connection with the throttle valve of a steam engine, as disclosed in Fig. 1, the chain may be moved by any suitable mechanism controlled by the speed of the engine, thus effecting opening or closing of the valve, through the medium of the construction hereinafter described, as occasion may require.

The disk 1 is formed with a plurality of concentric rows of circumferentially spaced bolt holes 7, certain of which are adapted to register with radial slots 8 in a plurality of segmental blocks which may be of the type illustrated at 9 in Figs. 1 and 2 or at 9ª in Figs. 3 and 4, bolts 10 being passed through the slots and bolt-holes to clamp the blocks frictionally in place.

The blocks 9 are shown at gradually increasing distances from the hub 2, so that their peripheral ends co-operate in forming a cam and while this cam could be used for numerous purposes, I have shown it engaging a lever 11 on a throttle valve 12 for moving said lever against any desired counterbalancing means, such as a weight 13. With this arrangement, assuming that the chain 6 moves in one direction when the engine travels above a predetermined speed but moves in the other direction when traveling under such speed, it will be seen that the sheave wheel will be turned and that the cam will move the lever 11 to open the valve 12 to a greater extent or slightly close said valve, as occasion may require, thus governing the speed of the engine.

The outer ends of the blocks 9 are preferably provided with flanges 14 spaced outwardly from the flat side 3 of the disk 1, to confine the lever 11 or other part to be operated, and prevent it from accidentally slipping from the blocks.

The form of blocks 9ª shown in Figs. 3 and 4 is intended principally for a different purpose. In these views, I have shown a sufficient number of the blocks to jointly form a second sheave to operate a chain or the like 11ª, the outer ends of said blocks being grooved as indicated at 14ª to receive said chain or the like. This construction may obviously be used for different purposes but is well adapted for stoker controlling mechanism, in which instance, the chain 6 may well be operated by a balanced damper control and the chain 11ª may effect adjustment of the stoker operating means, so as to supply a greater or lesser amount of fuel, as occasion may demand.

It will be seen that by providing the concentric rows of openings 7, and the slots 8, the blocks 9 or 9ª may be adjusted as required, to meet different conditions.

As excellent results are obtainable from the details disclosed, they are preferably followed, but within the scope of the invention as claimed, numerous minor changes may be made.

I claim:

1. A sheave wheel provided with a flat side having concentric rows of circumferentially spaced bolt holes, segmental members contacting with said flat side and having radial slots for registration with certain of said bolt holes, and clamping bolts passing through said slots and bolt holes to secure said segmental members frictionally against said flat side of the sheave wheel.

2. A sheave wheel comprising a hub-carried disk having a flat side in the same plane from the hub to its extreme peripheral edge, the other side of said disk having a peripherally grooved annular flange to receive a flexible operating element, said disk being formed with concentric rows of circumferentially spaced bolt holes, a plurality of segmental members for contact with any desired portions of said flat side, said segmental members having radial slots for registration with certain of said bolt holes, and clamping bolts passing through said slots and holes to frictionally clamp said segmental members in place.

3. A device of the class described comprising a hub-carried disk, and a plurality of blocks adjustably secured to one side of said disk at gradually increasing distances from the hub, forming an adjustable eccentric.

4. A structure as specified in claim 3; said disk having concentric rows of circumferentially spaced bolt holes, said blocks having radial slots, and bolts passing through said slots and certain of said holes, constituting the securing means of said blocks.

5. A device of the class described comprising a hub-carried disk, and a plurality of blocks adjustably secured to one side of said disk at gradually increasing distances from the hub, forming an adjustable eccentric for operating a lever or other part, the outer ends of said blocks having flanges spaced from the disk to prevent slippage of the lever or other part from said blocks.

In testimony whereof I have hereunto affixed my signature.

NELSON ROY KINDER.